Dec. 22, 1942.  M. WAGNER  2,305,820
VEHICLE WHEEL SUSPENSION
Filed Sept. 16, 1939

INVENTOR
MAX WAGNER
BY
ATTORNEYS

Patented Dec. 22, 1942

2,305,820

UNITED STATES PATENT OFFICE 2,305,820

VEHICLE WHEEL SUSPENSION

Max Wagner, Stuttgart, Germany; vested in the Alien Property Custodian

Application September 16, 1939, Serial No. 295,185
In Germany September 16, 1938

6 Claims. (Cl. 267—20)

The invention relates to an improved vehicle wheel suspension and is particularly concerned with wheels independently suspended on the chassis by guiding means such as link quadrangles, half axles, transverse springs and the like. Such guidance is particularly suitable for the front wheels of motor vehicles. One object of the invention is to mount the guiding means of the invention so as to be yieldable on the frame about a vertical axis, for example an axis provided by a vertical pivot, and to utilize a shock-absorber housing fixedly connected to the mounting member for the attaching thereto of a part of the guiding means, the joint pivot in such housing being at the same time utilized for actuating the shaft of the shock absorber so that the whole wheel suspension including the shock absorber can yield about the vertical axis of the mounting member in relation to the frame.

In comparison with known arrangements the invention has the advantage of considerable simplification since, due to the shock absorber housing being on the mounting member, a reduction of the number of parts is achieved and no additional space is required by the shock absorber.

Due to the arrangement of the shock absorber on a mounting member carrying both links of a guiding means and, consequently, the whole wheel suspension, such mounting member being arranged yieldably on the chassis, a particularly reliable wheel guidance is ensured with which the shock absorber is not excessively stressed in spite of the use thereof for the mounting of a guide link. This is because the horizontal forces arising at the wheel are divided in like fashion between the upper and lower links and are taken up evenly by the interposed mounting member, specifically a vertical pivot.

A particularly appropriate arrangement results if the shock absorber is arranged between forked arms of the upper link and preferably above a helical spring serving for the springing of the wheel and abutting against the lower link, since the shock absorber in this case requires little space for itself and is constructionally incorporated in the wheel suspension in a particularly advantageous fashion.

Figure 1:
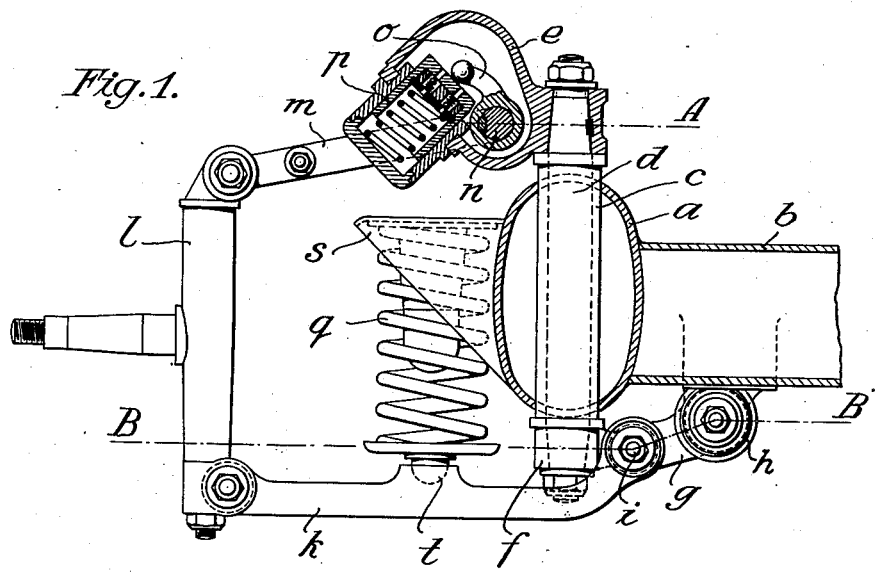
Figure 2:
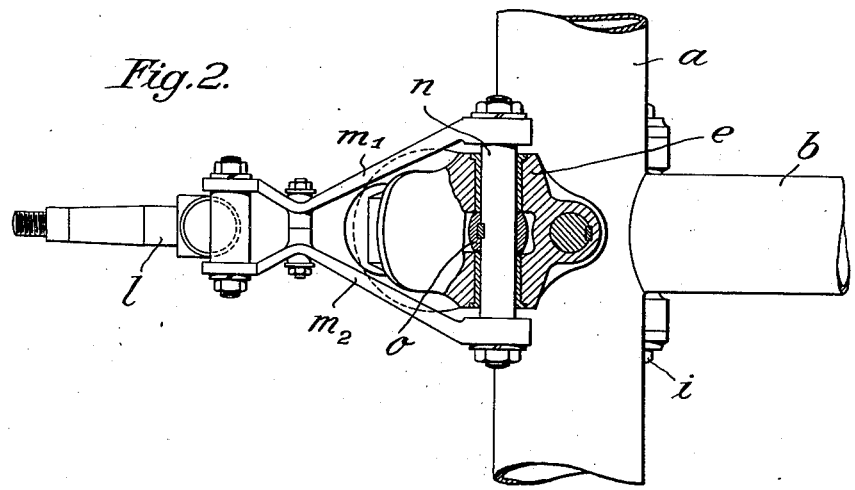

In the annexed drawing:

Figure 1 is a sectional side elevation of one construction of wheel suspension in accordance with this invention; and Figure 2 is a plan view of Figure 1 showing a partial section on the line A of Figure 1.

The vehicle frame or chassis is constituted by means such as longitudinal bearers $a$ of oval cross-section and tubular transverse bearers $b$ welded to them. A bushing $c$ penetrates one of the longitudinal bearers $a$ and is vertically and fixedly connected to it, for instance by welding. A pivot $d$ is mounted in this bushing $c$ and carries at its upper end, for example by screw means, the upper joint member $e$ constructed as a shock-absorber housing and at its lower end a joint member $f$ secured by screw means to the pivot $d$ or made in one piece therewith. Arranged on the joint member $f$ there is a lever arm $g$ extending inwards of the chassis and serving for the abutment of such joint member $f$ against the frame in the horizontal direction. The arm $g$ abuts against resilient, preferably rubber, cushions $h$ mounted on the frame. Furthermore, there is mounted on the lower joint member $f$, by means of the joint pivot $i$, the lower guide link $k$ of the wheel carrier $l$ which on the other hand is connected to the pivot $d$ by the upper fork-shaped guide link $m$.

The upper guide link is then preferably composed, as appears from Figure 2, of two parts $m_1$ and $m_2$ bolted together at their bent outer portions and connected at their inner ends by means of a pivot $n$ in the shock-absorber housing $e$. These bent link parts embrace the housing $e$ in fork fashion. The joint pivot $n$ further serves as the shock-absorber shaft. For this purpose, the actuating lever $o$ of the shock absorber is keyed directly upon the shaft or pivot $n$ of the upper guide link $m$ or is connected to the same in some other fashion so that the actuating lever $o$ acts in a manner known per se upon the shock-absorber piston $p$ in the housing $e$. By movement of the piston $p$, the damping fluid is forced in a manner known per se from one side to the other of the piston, as the case may be, through appropriately dimensioned throttling orifices.

The arrangement operates so that the damping lever $o$, during upward movement of the wheel, moves away from and independently of the damping piston $p$, and no damping occurs. On the contrary, a damping action is achieved during downward movement of the wheel because the arm $o$ will then press upon the piston $p$. Such downward movement of the wheel is influenced by the helical spring $q$ which abuts, on the one hand, against a mounting bracket $s$ disposed laterally on the longitudinal frame bearer $a$ and below the shock-absorber housing $e$ and, on the other hand, by means of a spherical joint $t$, against the lower link $k$.

Owing to the fact that the spring serving for the springing of the wheel abuts against the lower link, the upper guide link m is practically relieved from the spring forces, which is particularly advantageous as regards the stressing of the shock absorber.

The term "frame" as used throughout the description and claims is to be understood as not limited to such frames when formed separate from the body or coachwork of the vehicle, but to include such frame when it is formed integraly with or as a part of the body or coachwork, as is well-known in this art.

Having described an illustrative embodiment of the invention, it is pointed out that various changes and modifications therein may be made without departing from the invention as set forth in the claims which follow.

I claim:

1. In a vehicle having a frame, a wheel suspension comprising, in combination, a wheel carrier, a quadrangular linkage guidingly supporting said wheel carrier, a substantially vertical pivot on the frame, resilient buffer means resisting turning of said pivot, hinged mountings for the links on said pivot, one of said mountings consisting of a shock absorber housing directly mounted on said pivot, and a pivot shaft supported by said housing, which serves for attaching of the respective links as well as for the actuation of the shock absorber, in such a manner that the forces transmitted from the link to the frame can only be transmitted through the shock absorber housing.

2. In a vehicle having a frame, a wheel suspension comprising, in combination, a wheel carrier, superposed links guidingly supporting said wheel carrier, a substantially vertical pivot on the frame, resilient buffer means resisting turning of said pivot, hinge mountings for the links on said pivot, the upper one of said mountings consisting of a shock absorber housing, a pivot shaft supported by said housing which serves for attaching of the upper link as well as for the actuation of the shock absorber, means for attaching said shock absorber housing to said pivot, whereby the forces transmitted from the links to the frame can only be transmitted through the shock absorber housing, an abutment on said frame beneath said shock absorber housing, and a spring operative between the lower link and said abutment.

3. In a vehicle wheel suspension of the kind comprising superposed links mounted on a vertical pivot and influenced by a spring constantly tending to depress the links, turning of the vertical pivot being resisted by resilient abutments, the combination of a forked upper link, a shock absorber housing in the embrace of the fork of such upper link, mounting means for said housing on the upper end of said vertical pivot, a shaft journalled in said housing and having its ends extended for the pivotal attachment of the prongs of said forked link, and an arm on said shaft in operative relation with the shock absorber.

4. In a wheel suspension for vehicles having a frame including a longitudinally extending beam, in combination, a wheel carrier, a substantially vertical trunnion extending through the longitudinal beam and journaled thereto for movement about a substantially vertical axis, yieldable buffers intermediate said vertical trunnion and said frame for limiting the movement of the former relatively to the latter, a shock absorber housing supported by the upper end of said vertical trunnion, a pair of link members positioned one above the other and pivotally interconnecting said wheel carrier with said vertical trunnion for guiding the former relatively to the latter in a substantially vertical plane, said shock absorber housing forming the pivotal connection between the upper of said link member and said vertical trunnion, a spring abutment attached laterally to the longitudinal frame beam and positioned beneath the shock absorber housing, and spring means abutting against said spring abutment at one end and against the lower link member at its other end for resisting movement of the wheel carrier relatively to the frame.

5. In a wheel suspension for vehicles having a frame, in combination, a pivot pin on said frame for rotation about a substantially vertical axis, a wheel carrier, a pair of links pivotally connected at one end to said wheel carrier, a shock absorber housing, means for attaching said housing on said pivot pin, first pivotal means for pivotally connecting the other end of one of said links to said shock absorber housing, second pivotal means for pivotally connecting the other end of the other link to said pivot pin, said first pivotal means comprising a substantially horizontally extending shaft acting as a pivot means for the one link and as the shock absorber actuator, a spring bracket connected with said frame against vertical movement relative thereto, and spring means intermediate the other link and said bracket.

6. The combination according to claim 5, in combination with means for yieldably resisting rotation of said pivot pin relatively to said frame, and in which said spring bracket is mounted on said frame within the link quadrilateral formed by said two links, said wheel carrier and said pivot pin, said spring expanding substantially vertically between the lower link and said spring bracket, and said shock absorber housing being arranged above said spring bracket, the said horizontally extending shaft connecting the upper link to the shock absorber crossing said vertical pivot pin outwardly from the longitudinal central plane of the vehicle, and above said spring bracket.

MAX WAGNER.